Sept. 7, 1965     P. H. TAYLOR     3,204,945

LIQUID SPRING

Filed Dec. 18, 1961     3 Sheets-Sheet 1

INVENTOR.
Paul H. Taylor
BY
Popp and Sommer
ATTORNEYS.

Sept. 7, 1965

P. H. TAYLOR 3,204,945

LIQUID SPRING

Filed Dec. 18, 1961

INVENTOR.
Paul H. Taylor
BY
Popp and Sommer
ATTORNEYS.

3,204,945
LIQUID SPRING
Paul H. Taylor, Grand Island, N.Y., assignor to Tayco Developments, Inc., North Tonawanda, N.Y., a corporation of New York
Filed Dec. 18, 1961, Ser. No. 159,894
19 Claims. (Cl. 267—64)

The invention relates to a class of devices known as liquid springs, shock absorbers, commonly called shocks, particularly to a group of improved springs and shocks which, compared with those of the prior art, are desirably more effective because they respond to imposed, relatively large pressures and high velocity impact shocks with better spring rates, and surprisingly smoother, less jolting impacts at high velocity. Such and other desirable improvements result in part from the nature of the particular fluids with which the novel springs are charged, and in part from novel structural features which forms of the novel springs embody.

The fluid in a spring of the invention is selected according as it is to function in either or both gaseous and liquid phases throughout the temperature and pressure ranges within which the spring is intended to operate.

A spring in which the fluid at preload is in two phases responds particularly smoothly to a change in imposed loads by a transformation of the fluid from one phase to the other, and thereby affords a regulating adjustment of the fluid compression with softer yield than that of a liquid spring to the load change.

Liquid springs of the prior art, among these the Differential Area Liquid Springs described in my U.S. Patent 2,909,368 issued October 20, 1959, have widely replaced mechanical spring shock absorbers, mainly because in point of space occupancy and capacity for absorbing high energy impact shocks, they are much more effective than mechanical springs. For this and other less important reasons springs in which liquid only is the contained fluid, are important and widely used constituents of many types of machines among them dies, machine tools, aircraft, missiles, spaceships, railroad cars, etc., in fact wherever a spring's weight, space occupancy, and capacity for energy absorption are of paramount importance. However, the range of utility of every liquid spring is limited particularly by the limited compressibility of its liquid component, and by the temperature conditions under which the unit operates and in the combined shock by the flow through its orifice.

Where liquid spring undergoes wide thermal changes the spring's operation is adversely affected by the difference between the rates of expansion of the motivating liquid and of the containing structure. The heavy-walled steel type of vessel ordinarily used for a liquid spring cannot and does not expand or shrink as much as its contained liquid which, for example, may be a silicone with a coefficient of expansion about double that of the surrounding steel container. The difference results in an undesirable decrease of spring force at low temperatures although the high temperatures are not as critical. Such effects prompted the issue of widely recognized specifications which require that liquid springs must operate effectively within ranges contained between −65° F. and +165° F. To overcome this expansion difficulty, liquid springs have been designed so excessively large that only a small percentage of the available compressibility of the liquid in a spring is employed in the spring's operational temperature range, the balance of the compressibility being used in temperature compensation. Since liquid silicones commonly used in liquid springs expand 1% per 18° F. temperature rise, it is possible to meet minimum spring requirements for various temperature ranges by having the liquid under high preload i.e., initial pressure. However, such a method of dealing with the problems of temperature compensation necessarily involves a proportional increase in the dimensions, weight and efficiency of the spring.

Significant disadvantages of liquid springs stem from the diminutive compressibility of liquid with which such springs are filled. A liquid spring, even when in sound operating condition, responds rapidly, stiffly and harshly to imposed shocks of high velocity impacts because the yield or compression of its liquid to applied pressure is very small compared for example with that of a gas. Simultaneously and with substantially equal speed, the compressed liquid transmits the pressure imposed upon it to the spring's structure and generates therein significant and complicated stresses and strains. To withstand the relatively large shock and consequent strains which liquid springs encounter in industrial and military uses the springs must be fabricated with thick walls, special seals, fitments and finishes, all of which necessarily enlarge dimensions, weights and costs of such springs. It is noteworthy that with the exception of the liquid springs which are described and claimed in U.S. Patent 2,909,368, and use a differential piston area to provide small piston areas, the liquid springs of the prior art have high spring rates.

Furthermore presently favored liquid spring shock absorbers, which use any of the much favored silicones as the motivating liquid react peculiarly to extremely high velocity shock impacts such as are encountered in mortar recoil systems or in mechanisms of arresting hooks utilized for snubbing an aircraft at relatively high landing speeds, for example 150 miles per hour. Where such liquid spring embodies a dashpot, it is virtually impossible to get adequate liquid through the dashpot orifice unless the said orifice is excessively large or there are several orifices. In instances where for a particular application a dashpot orifice is made larger, the area of the dashpot is made smaller; however where extremely high velocity impacts are encountered, a larger dashpot area is desirable. In other words, liquid spring shock absorbers, as now constructed with dashpots, are not fully suited to extremely high velocity impacts.

It has also been found that flow of liquid energized by shock from extremely high impact velocities through an orifice takes on very unusual characteristics. Under such circumstances the liquid sometimes flows in high frequency pulses, and at times even assumes the characteristics of a very viscous or solid mass. Such effects have been overcome by changing the orifice to a venturi-like gradually enlarging conical form to provide minimum impedance to the rate of discharge. This improving change in orifice form is one feature of the present invention.

The enormous expanding uses of mechanisms which involve pressure applications and responses thereto emphasize the immense importance of fluid springs. There is a great need for improved forms of such springs for every range of imposed loads, especially for springs which, compared with such as are currently used, are smaller in size and weight yet effectively absorb and manage the huge amounts of energy of imposed pressures and shocks of high velocity impacts by smoother and less jolting yields and recoils.

A major need for improving liquid springs has been one or more liquids which have greater compressibility than liquids currently used, and are readily available, reasonably stable, compatible chemically with the materials of construction of the spring and relatively inexpensive.

The primary objective of the present invention is an improved more efficient fluid spring which retains the advantages and avoids most of the disadvantages such as those noted above of liquid springs of the prior art.

Specifically the novel fluid springs of the invention use fluids which have not been used hitherto in liquid form and are decidedly more compressible than liquid used in liquid springs of the prior art. Furthermore the novel springs are capable of providing (1) the low pressure operation, low spring rates and softer yield to pressure of gas springs; (2) the compactness, high shock resistance and restraining yield to compression of a liquid spring, and (3) the dampening effects of dashpots with small orifices on shocks of high velocity impacts.

A part of the present invention is the discovery that the liquid phases of some gaseous compounds, for example the liquid forms of propane, butane and nitrous oxide, are more compressible than liquids—including the liquid silicone alleged to be the most compressible liquids now known—and used hitherto in liquid springs. Such liquified gases are liquid at —65° F.; boil under pressure of one atmosphere at or below 70° F., and have a critical temperature above about 90° F. Such compounds are particularly suitable and preferred fluids for springs of the present invention, particularly for the fluid springs in which the fluid is present at preload in both liquid and gaseous phases.

The manner in which such compounds may be selected for use, a spring in which the fluid is nitrous oxide in two phases may be illustrative. It can be foretold that the pressure equilibrium load in the spring at —40° F. is about 140 p.s.i., at 68° F., about 740 p.s.i., at 97.6° F. which is the critical temperature of nitrous oxide, the equilibrium load is 1,054 p.s.i. Above 97.6° F., the spring becomes wholly a gaseous spring and remains such until the temperature of the fluid reverts to or below 97.6° C. Thus to the advantage "softer yield" to compression by the gas phase, is added the greater compressibility of the liquid phase of the gas.

Gases other than those named above may be selected in a similar manner by considering the physical state and thermal pressure characteristics of a gas and the ranges of loads and temperature in which the fluid spring is to operate.

A second objective is an improved fluid spring which, compared with former like structures, has a longer stroke and lower spring rate which result from using as the motivating liquid, a liquified gas which has decidedly greater compressibility than liquid silicones which are alleged to have the highest liquid compressibility known.

A third objective of this invention is a compact fluid spring or shock absorber which provides the low spring rate and other advantages of gas compression in a gas spring with the high shock resistance and dampening of liquid compression of a liquid spring.

A fourth objective is a compact fluid spring which provides two stage springing with a long stroke and lower spring rate, which result from compressing a partly gaseous and partly liquid fluid thereby liquifying the total liquid phase.

A fifth objective is a fluid spring which, with a fluid therein in both its gaseous and liquid phases as the motivating medium, is made in the form of a differential area liquid spring with the long stroke, low spring rate and high resilient resistance characteristic of differential area liquid springs.

A sixth objective is a fluid spring or shock absorber which is less bulky than former springs of comparable load capacity even where temperature variations are severe.

A seventh objective is a shock absorber which is characterized by the high energy storage capacity of a high pressure liquid spring and the flat spring rate of a gas spring followed by the rapid dampening capabilities of a liquid shock absorber.

An eighth objective is an improved high impact velocity liquid spring shock absorber.

A ninth objective is an improved spring shock absorber with dashpot control in which the size of the dashpot orifice and of the dashpot area in comparison with such dimensions in prior art liquid springs of like load capacity, are smaller and more effective, by virtue of the transition of the liquid to its gaseous phase on travelling through the improved form of dashpot orifice.

A tenth objective is a simple improved form of non-recoil valve in a differential piston area spring motivated by compression of liquid.

An eleventh objective is a spring operable at lower pressures particularly in that extremely high pressures are not required for temperature compensation.

A related objective of this invention is an improved fluid spring in which the compressible motivating material is an inexpensive readily available fluid with physical characteristics which differentiate it from fluids used hitherto in fluid springs and particularly contribute to the improved capabilities of the novel fluid springs.

A second related objective is an improved fluid spring or shock absorber which contains its fluid in two phases —both gaseous and liquid, and has the capability of responding to applied pressures, in two stages, the first by compression of the gaseous phase to its liquid phase, and then compression of the total liquid phase, thus combining in the one spring the cumulative response progressing from that of a gas-filled spring to and through that of a liquid filled spring.

A third related objective is an improved fluid spring or shock absorber which by virtue of its selected fluid and its interaction with the spring structure is capable of absorbing and storing the huge amounts of energy of imposed shocks of high velocity impacts.

A fourth related object is to provide maximum dashpot area and minimum dashpot orifice area for a high velocity shock absorber.

A fifth related objective is an improved spring or shock absorber in which the utilized fluid at preload can be in gaseous phase or in liquid phase or partly in gaseous phase and partly in liquid phase.

Another object is the provision of a pressure sealing check means whereby the elastomer is only subject to pressure during cycling.

Other objectives and advantages of the invention will be apparent from the following descriptions and drawings.

Figure 1:
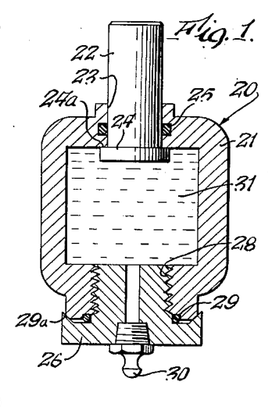
FIG. 1 is a longitudinal section through a simple form of fluid spring which can be conventionally motivated by either a gas or a liquid. Gaseous and liquid forms of propane, butane and nitrous oxide are preferred examples of fluid which are suitable for the practice of the present invention.

FIG. 1 illustrates diagrammatically a liquid spring 20 having a housing 21 which may be cylindrical or any other desired shape. Piston 22 is slidable by way of bore 23 through the side wall of the housing 21 and has a head 24 in the housing 21 to limit the outward movement of the piston under pressure of the contents of the housing. A sealing ring 25 in an annular recess of the bore 23 seals the periphery of the piston 22 to prevent escape of gas or liquid under dynamic cycling. The face 24a engaging the end head of the housing 20 acts as a check valve to seal against gas leakage when under no external applied load. This is desirable as the dynamic seal 25 is subject to wear and is released from service under no load conditions. Housing 21 has a threaded opening 28 through its side wall into which is screwed a plug 26 with a suitable elastomeric seal 29 and back-up seal 29a to prevent escape of high pressure liquid material from the housing. This liquid material under pressure is introduced through a replenishing fitting 30 into the previously evacuated housing. The body of liquid in the housing is represented by 31. In the practice of the present invention liquid 31 is the liquid form of a gas such as propane, butane, nitrous oxide, etc.

In an operating condition of the fluid spring of FIG. 1 the housing 21 is completely filled with an appropriate fluid which may be a liquid such as a liquid silicone, or a gas such as one of those noted above, or particularly for the present invention, the liquid form of such a gas. The response of such a fluid-filled spring (as represented in FIG. 1) to imposed pressure is graphically shown in FIG. 2 in which the abscissae, in terms of length of inward stroke, proportionately represent diminution by compression of fluid volume as a result of piston penetration into the chamber. The ordinates represent the consequent pressure response to the squeeze of the fluid, in terms of p.s.i.g.

Figure 2:
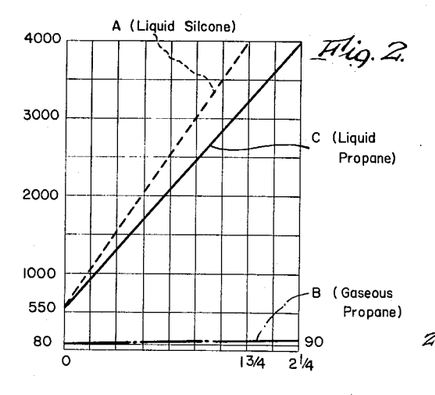
FIG. 2 is a graph which summarizes and permits comparisons of the responses to pressure of the fluid spring illustrated in FIG. 1 when the motivating liquid is a liquid silicone and when the fluid is liquid propane.

Line A represents the response of a liquid silicone of the highest compressibility known to a 1¾ inch inward stroke of piston 22 against a preload pressure of 550 p.s.i. and an end load of 4,000 p.s.i.g. Line B represents the response of gaseous propane to a 2¼ inward stroke of the piston against a preload pressure of 78 p.s.i.g. and an end load of 80 p.s.i.g. Line C represents the response of liquid propane to a 2¼ inward stroke of the piston against a preload of 550 p.s.i. and an end load of 4,000 p.s.i. FIG. 2 shows that to dampen the applied pressures within the same range of loads from preload to 4,000 p.s.i., the inward piston stroke into liquid propane as the spring fluid was about 38% greater than the inward stroke when the liquid silicone was the spring fluid. This surprising result significantly indicates that liquid propane is about 38% more compressible than the highly rated liquid silicone, the more compressible silicones being 16.1% compressible at 20,000 p.s.i.g. and liquid propane being 22% compressible at 20,000 p.s.i.g. Liquid forms of other gases, for example butane and nitrous oxide, with similar greater compressibility, than liquids formerly used in liquid springs can be used to equip such springs with desirably longer piston movements lower spring rates and smaller size without sacrificing load capacity.

If the spring is to function wholly as a liquid spring, the liquified form of the gas necessarily must be selected with due regard for the range of temperatures in which the spring is expected to operate and for the pressures to which it can be subjected.

To remain liquid at all time the liquified gas must be under a pressure which exceeds the liquid's saturated vapor pressure at all temperatures of the spring's operational temperature range. Because of this imposed limit, the liquified gas must have a critical temperature above the topmost temperature of the operational temperature range, the preload pressure of the spring must be above the vapor pressure of the liquid at the said topmost temperature, and the liquid containing chamber of the spring must be substantially filled with the liquid. Such conditions maintain the fluid in liquid phase and preclude its transition to a gaseous phase in an adequately equipped spring. To shorten the piston stroke of a liquid spring so equipped, a higher preload can be used.

Figure 3:
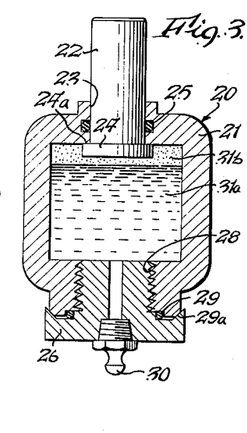
FIG. 3 is a view similar to that of FIG. 1 showing the fluid spring in its preload condition with the fluid therein partly in liquid form and partly in gaseous form, and able to go through transition from gas to liquid and liquid to gas by changes of pressure imposed upon the fluid by operations of the spring.
Figure 4:
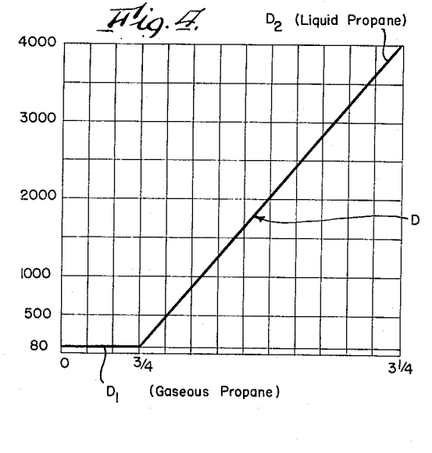
FIG. 4 is a graph of the response to compression of the fluid spring and illustrates the change in action of the spring through the transition of a fluid such as propane from its gaseous to its liquid phase by increasing pressure.

An additional feature of the invention is that the transitions of gases, like those exemplified above, from gaseous phase to liquid phase and from liquid phase to gaseous phase can be used advantageously to achieve still further improvements in fluid springs such as are represented by FIGS. 3 and 4.

In FIG. 3 the illustrated spring body is that illustrated in FIG. 1 and hence the same reference numerals are employed. An important distinction resides in the maintenance of the liquid gas, in the threshold or preloaded condition of the spring, both in liquid form, as illustrated at 31a and also in gaseous form as illustrate dat 31b. To this end, the preloaded pressure is appropriately adjusted to a level at which the fluid exists in both liquid and gaseous phases in the housing 21, this being in the order of 80 p.s.i.g. under ordinary temperature conditions. With the propane, butane or nitrous oxide so in both liquid and gaseous phases in the inoperative condition of the spring, the response curve D illustrated in FIG. 4 partakes of both phases. Thus, the initial inward movement of the piston 22 results only in compressing the gas 31b and hence the piston has a long range of movement against little resistance, as illustrated by the initial flat or horizontal part $D_1$ of the curve D. When the space occupied by the gas is used up, however, the piston 22 is required to compress the liquid propane and hence the curve shifts to the steep slope $D_2$ which characterizes liquid propane as illustrated in FIG. 2. With the increasing back pressure of the liquid in the housing 21, the gaseous propane 31b is transformed into liquid form so that a polymorphic transition from the gaseous to the liquid phases, and vice versa, of part of the propane, takes place on each complete cycle of action of the spring.

FIG. 4 graphically illustrates the unusual dual rate spring results flowing from the use of such a liquid gas spring undergoing polymorphic gas-liquid transition. The piston has an initial movement against little resistance, so for light loads the spring is in fact a "gas" spring with the advantages of "gas-spring sensitivity" of response, especially desirable long piston travel and the low spring rate which characterize the response of gas springs to high frequency oscillations. Further, the pressure of the gas against the seal 25 is relatively low so that a normal seal is adequate to prevent escape of the gas, which unlike a liquid is much more difficult to contain by means of a seal. When the gaseous portion of the motivating fluid is condensed by the applied pressures to make the fluid completely liquid, the spring acquires all the advantages of a liquid spring. This result is illustrated in FIG. 4 by the substantially level "curve" $D_1$ which represents the condensation of the gas to its liquid phase, and by the steep slope of the "curve" $D_2$ which represents the response; the liquid to increasing pressure. Thus, the internal pressure and hence the reactive force of the spring can readily withstand up to 20,000 p.s.i.g The compression curve $D_2$ graphically represents the more favorable results in point of piston travel and low spring rate obtained with liquid propane than with the most compressible silicone liquids now known. FIG. 4 also indicates that when pressure is applied to a spring in which the motivating fluid, for example propane is partly in gas phase and partly in liquid phase the response to such pressure is initially the lenient but increasing resistance to compression of the gas, followed by the intense resistance to compression of the liquid. The additive result is evident in the very long overall travel of the piston and the resulting low spring rate.

Such a spring has advantages in vehicle suspension where long travel and shock absorption is desirable.

The compound gas and liquid curve $D_1+D_2$ of FIG. 4 also indicate that the use of a gas-liquid type of fluid spring illustrated by FIGURE 3 offers advantages where two-stage springing or shock absorption is needed. For example, it can improve the riding quality of a vehicle over even normal roads and thus enable travel by such a car to be a soft or boulevard ride. The aforesaid gas-liquid type of fluid spring response is also desirable in various types of machine tools which are required to operate with a soft draw through part of the stroke and then to stiffen up and hold the workpiece while a hole, for example, is punched in the workpiece after the said draw.

In order to fill the spring with fluid at the intended preload pressure, the spring, for example one diagrammatically respresented by FIGURES 1 and 3, is evacuated, and then charged from a container of the selected fluid via nipple 31. At such filling, the spring and fluid container are adjusted for temperature and for quantity transfer of fluid to attain the desired charge of liquid, or gas, or liquid and gas for the appropriate preload pressure in the spring.

Figures 5, 6, 7:
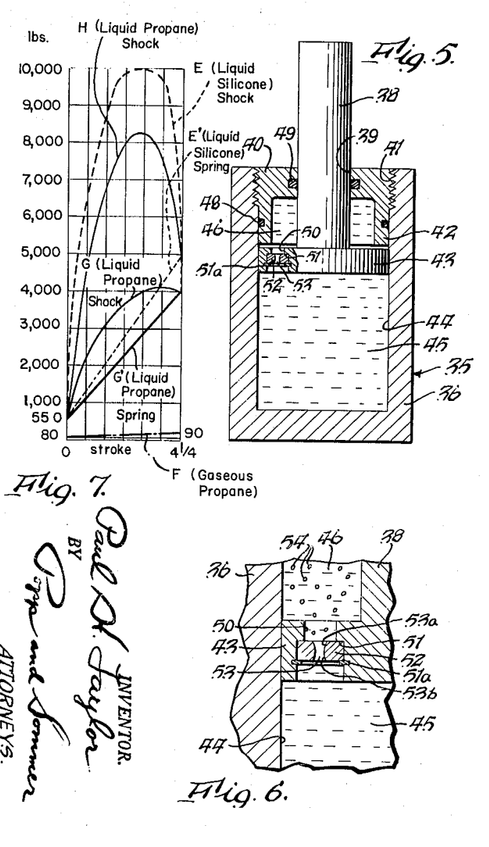
FIG. 5 is a longitudinal section through a fluid dashpot-type of shock absorber which can be conventionally motivated by either a gas or liquid but which is shown as being motivated by the liquified form of a gas, such as liquid propane in the practice of the present invention.
FIG. 6 is an enlarged view of the fragmentary area in FIG. 5, which shows the dashpot orifice with its venturi-like or conically enlarging form toward its fluid release side when the fluid spring is responding under a pressure impulse.
FIG. 7 is a graph comparing the respective responses to pressure of the shock absorber as illustrated in FIGS. 5 and 6 when it is filled with a silicone liquid of the highest compressibility now known; with liquified gas, specifically liquid propane, under high velocity shock loads; and with a gas going through transition under imposed pressure load.

FIG. 5 illustrates a form of fluid spring which is shown in FIGS. 1 and 3, but as modified by the addition of a dashpot head, which by coaction with other provided parts described hereunder, acts as a spring dashpot shock absorber 35. The shock absorber is shown as having a cylindrical housing 36 and a piston 38 which is slidable through a concentric bore 39 in an end head 40 which is screwed into the threaded open end 41 of the housing 36. The end opposite to end 41 of the housing is closed. The bore 39 continues through a tubular, axial inward, integral extension 42 of the end head 40 which forms a stop for a dashpot head 43 the periphery of which mates with the main bore 44 of the housing 36. This dashpot head 43 divides the interior of the shock absorber into two chambers 45 and 46. Annular seals 48 and 49 can be interposed between the housing 36 and its end head 40 and between the piston 38, respectively.

The dashpot head 43 is shown as having a stepped bore 50 therethrough which provides a shoulder 51 for an orifice plug 52 which is shown as having an orifice 53 therethrough. The shoulder 51 opposes the main force against its orifice plug 52, that is, it opposes the chamber 45, and snap ring 51A holds the orifice plug 52 in place.

The form of the orifice 53 is an important feature of the invention whether the motivating fluid of the novel spring is a liquefied gas such as propane or another compressible liquid, such as a liquid silicone. The shape of this orifice is venturi-like, that is, it is of enlarging conical form, as represented by 53a, toward its discharge end nearest to chamber 46 in which direction the orifice discharges during the working stroke of the spring shock absorber. Desirably the opposite end of the orifice is also of enlarging conical form as represented by 53b, this becoming the discharge end of the orifice during the return stroke of the shock absorber.

The action of the spring shock absorber such as is represented in FIG. 5, and filled with a liquid silicone of the highest compressibility available, is illustrated by the response curve E, FIG. 7, in which the pressure is plotted against a 4½ inch stroke of the piston 38 in 2 milliseconds. The response of silicone when used as a spring is represented by the straight line curve E'. Even at this relatively low impact velocity, the shock pressure represented by curve E reaches a 10,000 pound peak force shortly after mid stroke and settles back to approximately 4,000 pounds force. It will be noted that at the same velocity, the peak shock force on the liquid propane is approximateley 4,200 pounds force. This pressure peak reveals the inability of the liquid silicone to get through the orifice 53 fast enough. While the venturi-like shape of this orifice 53 helps somewhat to increase the discharge of compressed liquid from chamber 45 to chamber 46 and lower the peak pressure, the orifice nevertheless limits the flow of a liquid and remains a limiting factor to the use of liquids in dashpot types of liquid spring shock absorbers.

In processes which use liquid spring shocks to offset the shock of impact velocities many times larger than that illustrated in curve E of FIGURE 7, such springs have been known to "go solid" i.e. immovable through failure of the orifice (corresponding to orifice 53) to transmit the compressed liquid rapidly enough to cushion the impact shock. This is scarcely relieved at all by the low compressibility of liquids—like liquid silicone used hitherto—and therefore by the small volume reduction and increased density of the liquids by the imposed pressures. Such liquid spring behavior may be somewhat avoided by increasing the size of its orifice or the number of orifices in the dashpot head, but such relief to increase liquid transmission decreases the effective face area of the dashpot head and consequently the range of effectiveness of the spring. Such changes cause complicated design problems, render the resulting spring shock absorbers much less efficient and even useless at lower impact velocities. To compensate for such lowered efficiencies the springs must be greatly and undesirably enlarged. Since a particularly necessary feature of liquid spring shock absorbers is compactness, the undesirable changes above noted, diminish an important principal utility of liquid springs.

The curve F, FIG. 7, included for reference, is the response curve of the spring shock absorber 35 when filled with gas, but the curves G, and G' FIG. 7, represent the response curves when the spring 35 is filled with liquid propane, the curve G' being its response when used as a spring and the curve G being its response when used as a shock absorber. Similar responses can be obtained when this shock absorber is filled with liquid forms of butane and nitrous oxide. It will be noted that curve G (shock absorber) departs only slightly from the spring response curve G' which shows that even with the small orifice 53 which did not prevent disastrous pressure peak with the use of a liquid silicone (curve E), the rate of flow of liquid propane through the small orifice 53 is not cut down below undesirable values. It appears that on release from the orifice 53, especially with the venturi-shaped orifice, the pressure drop is such as to effect transition of the liquid propane to gaseous propane, the gas forming as small bubbles 54, and consequently the flow through the orifice 53 more closely approaches the laminar flow of a gas therethrough, while the resistance ahead of the dashpot is entirely predicated on the differential in pressure on the opposite sides of the dashpot head 43. It should be observed here that when the velocity is ten times that indicated by curves G and E, a liquid propane shock curve, H, will be generated, having a peak force slightly in excess of 8,000 pounds force, and it is still substantially below that of the silicone when it is at 1/10 the velocity. It will thus be seen that liquid gas springs have a particularly desirable range, such as for gun recoil mechanisms or high velocity presses, such as the explosive type of device.

Figure 8:
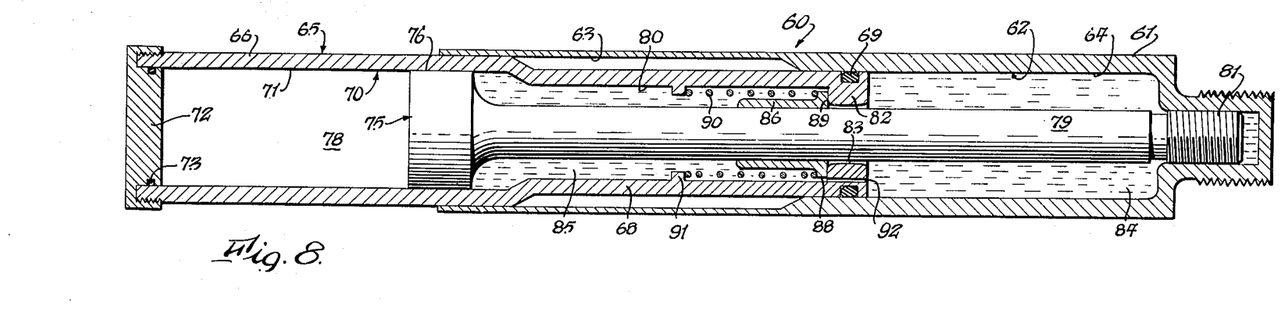
FIG. 8 is a longitudinal section through a non-recoil spring shock absorber motivated by a liquified gas, such as the liquid forms of propane, butane, nitrous oxide and similar fluids, and embodying additional features of the present invention, the non-recoil spring shock absorber being shown in its extended or inoperative position.
Figures 9, 10:
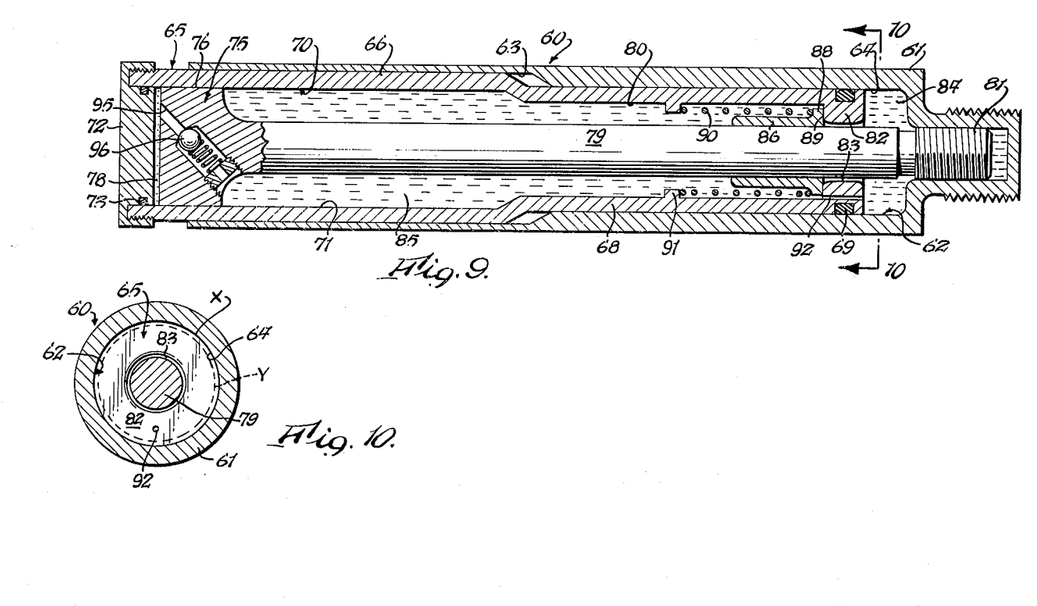
FIG. 9 is a view similar to FIG. 8, but showing the non-recoil spring shock absorber in its fully compressed condition.
FIG. 10 is a transverse section taken generally on line 10—10, FIG. 9.

FIGS. 8 to 10 inclusive illustrate an improved differential area fluid spring which is particularly adapted to use the liquified form of a gas, such as propane, butane or nitrous oxide. FIG. 10 represents the view of the section in the plane 10—10 in FIG. 9. In addition to the compactnesses, economy of manufacture, high degree of resilient resistance stroke and spring rates of former differential area liquid springs which use for example, a liquid silicone; the illustrated novel fluid spring is capable of even longer stroke and lower spring rates by using as motivating fluids, the gaseous and liquid forms of gases noted above. The improved spring can be charged with fluid which is in part gas and in part liquid. As previously noted, such a spring can function by one or two stages, the first by a relatively long compression of the gas for a relatively light load, and for a relatively large load, by continuing the compression to complete liquefaction of the gas to liquid phase and thereafter the whole fluid in liquid formr. The modified venturi-like dashpot orifice of the modified spring illustrates in FIGS. 8 to 10 the transition of the liquid to its gaseous phase as the liquid is pushed by pressure through the orifice.

In FIGURES 8 to 10, the spring 60 has a tubular body cylinder 61 with a stepped blind bore 62 of which the large diameter portion 63 forms the outer open end and the small diameter portion 64 forms the inner blind end. The bore contains a hollow cylindrical piston or ram, indicated generally at 65, with a large diameter end 66 slidingly fitting the outer large diameter portion 63 of the stepped bore 62 and having an opposite small diameter end 68 fitting the inner small diameter portion 64 of the stepped bore 62. An external liquid seal ring 69 on the small diameter end 68 of the ram 65 seals against the bore 64. The ram or piston 65 is provided with a central through bore 70, the outer end of which is enlarged to provide a cylindrical bore 71 enclosed by an end head or cap 72 screwed on the outer large end 66 of the ram with an external liquid seal ring 73 interposed between the cap and ram.

A studhead piston 75 has its periphery fitted in the cylindrical bore 71 to provide a limited clearance 76 therebetween to permit the passage of gas to the chamber 78 between this piston and the end cap 72. This piston 75 is fast to a stud 79 which extends coaxially through the inner small end 80 of the through bore 70 and is fixed to the body cylinder 61 at the blind end of its stepped bore 62 by a threaded connection 81.

The end, opposite from the large diameter end 66, of the small diameter end 68 of the ram 65 is further reduced to provide a dashpot head 82 surrounding the stud 79 with a clearance providing a dashpot orifice 83 between the high pressure chamber 84 formed by the body cylinder 61 and the cylindrical chamber 85 within the ram 70 on the stud side of the piston 75. If a non-recoil shock absorber is required, a non-recoil sleeve valve 86 can be arranged to close this dashpot orifice 83 during the recoil movement of the shock absorber. This recoil valve head has an enlarged annular valve head 88 which seats against an annular valve seat 89 on the side of the dashpot head 82 facing the piston 75 and surrounding the annular orifice 83, this recoil valve being biased to its closed position by a surrounding helical compression spring 90 which abuts against an annular rib 91 projecting inwardly from the ram 65. To permit recoil movement of the spring at a controlled rate, a secondary orifice 92 can be provided through the dashpot head 82 out of control of the non-recoil valve 86 for controlled return.

A passage 95 extends through the piston 75 to provide communication between the chambers 78 and 85 and contains a spring loaded check valve 96 which closes toward the chamber 78 to permit flow of fluid from this chamber to the chamber 85 but to prevent reverse flow from the chamber 85 to the chamber 78 so that stroking of the spring will return leakage by this seal in the form of liquid gas to the chamber 85. It should be noted that because of the solid nature of stud head 75, and its sealless construction, deflection of piston 65 will permit gas to pass stud head 75 and stroking of the spring will return it in liquid form to the chamber. Preferably, stud head 75 utilizes the nylon coating of Patent 2,909,398, which in itself is a reasonably good seal and, therefore, permits passage slowly.

The effective differential piston area of this spring is represented by the space between the circles X and Y, FIG. 10, the former representing the small diameter portion 64 of the bore 62 and the latter the larger diameter end 71 of the cylindrical through-bore 70 of the ram 65.

In the operation of a differential area fluid spring such as is represented by FIGS. 8–10 and containing as the motivating fluid both the gaseous and the liquid phases of a gas such as propane, the gaseous phase in the chamber 78, the inward movement of the ram 65 is resisted by the differential area of this ram 65 and the piston 75 but is also modified by the flow of liquid through the orifice 83. Thus, as the ram dashpot head 82 moves into compressive relation with the liquid in the chamber 84, the piston withdraws from or enlarges the chamber 85 so that the net effect is greater area of the ram as compared with the piston. As this differential area increases, the spring becomes "stiffer," the ram movement decreases and the spring rate increases. Conversely, as this differential area decreases, the spring becomes "softer," the ram movement mounts and the spring rate declines. Leakage past the piston 75 reduces its effective size and if any of the fluid in chambers 84 or 85 exists initially in the gaseous phase, the gas will condense until its transition to liquid is completed, substantially in the manner represented by the curve $D_1$ in FIG. 4.

When the spring is fully compressed, as shown in FIG. 9, excess liquid in the fully contracted chamber 78 can return to chamber 85 via the check valve 96, and in liquid form responds to compression in the manner illustrated by curve C, FIG. 2. Return flow of the liquid phase of the fluid, for example liquid propane from chamber 85 to chamber 84 via the orifice 83 is prevented by the non-recoil sleeve valve 86 and the rate of return on outward movement of the ram 65, under the compression of the liquid in the chambers 84 and 85 is controlled by the bleed orifice 92 through the dashpot head 82. The size of this bleed orifice 92 can be proportioned to provide any desired rate of return movement, such return movement again being a function of differential piston areas between the ram 65 and the piston 75.

Figure 11:
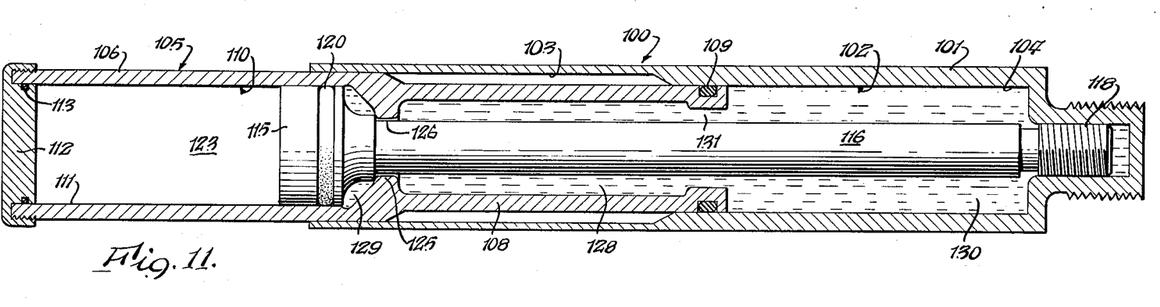
FIG. 11 is a view similar to FIG. 9, but showing a spring shock absorber capable of both a desirably effective response to shock of high velocity impact, and a high recoil force.
Figures 12, 13:
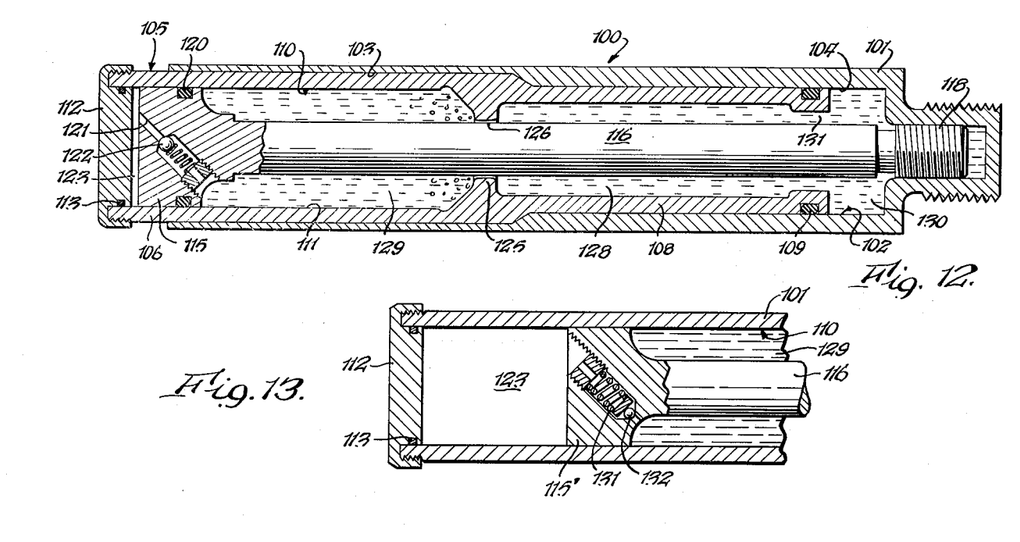
FIG. 12 is a view similar to FIG. 11, but showing the spring shock absorber in its fully compressed condition.
FIG. 13 is a view similar to FIG. 12, but illustrating a pressure relief valve which permits simultaneous use of the gas and the liquid in the same spring.

FIGS. 11 and 12 illustrated another improved modified form of differential or fluid spring in which the motivating fluid such as propane, butane or nitrous oxide is a gas in either or both fluid phases. This form too is particularly characterized by the advantages over previous liquid springs as hereinbefore described.

The spring 100 has a tubular body cylinder 101 with a stepped blind bore 102, of which the large diameter portion 103 forms the outer open end and the small diameter portion 104 forms the inner blind end of the bore. The bore 102 contains a hollow cylindrical piston or a ram, indicated generally at 105, with a large diameter end 106 slidingly fitting the outer large diameter portion 103 of the stepped bore 102 and having an opposite small diameter end 108 slidingly fitting the inner small diameter portion 104 of the stepped bore 102. An external liquid seal rings 109 on the small diameter end 108 of the ram 105 seals against the bore 104.

The ram or piston 105 is provided with a central through-bore 110, the outer end of which is enlarged to provide a cylindrical bore 111 enclosed by an end head or cap 112 screwed on the outer large end 106 of the ram. An external liquid seal ring 113 is interposed between the cap and ram. A piston 115 has its periphery fitted in a cylindrical bore 111 and is fast to a stud 116 fixed to the body cylinder 101 at the closed end of its stepped bore 102 by a threaded connection 118. The piston 115 is provided with an external seal ring 120 which seals against the large part 111 of the bore 110 in the ram 105, and this piston head 115 is also provided with a through passage 121 which is under control of a spring-loaded check valve 122 opened toward the chamber 123 between the piston head 115 and the end cap 112 of the ram 105. The ram 105 is provided internally with a dashpot head 125 surrounding the stud 116 and the clearance 126 between this dashpot head and the stud 116 constitutes a dashpot orifice 126 between the chamber 128 within the smaller part 108 of the ram 105, and the chamber 129 between the dashpot head 125 and the piston 115. The chamber 128 is in open communication with the chamber 130 of the body cylinder 101, as indicated at 131.

In the operation of the differential area fluid spring shown in FIGS. 11 and 12 with a fluid, such as propane, this motivating fluid, in the extended position of the spring indicated in FIG. 11, is essentially in gaseous form in the chamber 123 and is in liquid form in the chambers 129, 128 and 130, although a part of the fluid in these latter chambers can be in gaseous form and on initial compression by imposed load condenses to liquid as previously described and illustrated by the portion $D_1$ of the curve illustrated in FIG. 4. The inward movement of the ram 105 is resisted by the differential area of this ram and piston 115 as modified by the flow of liquid through the orifice 126. Thus, as the ram 105 moves into compressive relation with the liquid in the chambers 128 and 130, the piston 115 withdraws from or enlarges the chamber 129 so that the net effect is the greater area of the ram as compared with the piston. As with the fluid springs which are represented by FIGS. 8–10, an increase in the differential area causes the spring to stiffen its reaction; its ram movement to decline and its spring rate to enlarge if this differential area decreases the spring becomes softer, the ram movement mounts, and the spring rate declines. The contracting and compression strokes of the liquid spring 100 are controlled by the size of the area of the orifice 126 which determines the rate of travel of the liquid from the chamber 128 to the chamber 129. It should be noted that the location of dashpot head 125 and adjacent stud head 115, causes evacuation of chamber 129 on sudden movement of piston 105 with respect to cylinder 101. This sudden evacuation enhances the flow through orifice 126 in the manner indicated in FIGURE 6 so that this location permits higher velocity than that of FIGURES 8 and 9. Conversely, since the volume in chambers 128 and 130 is substantially greater as compared with the total volume of the spring, the initial slope of the response curve is more gradual since the volume, subject to compression by the effect of the piston or dashpot head 126, is greater.

FIGURE 13 is a view similar to FIG. 12, in which the spring loaded ball valve in the stud head 115' which corresponds to the stud head 115, FIG. 12, has been reversed and a heavier coil spring 131, is employed against ball 132, so that on full compression of the piston to the position of FIGURE 12, the higher pressure of the liquid gas in chambers 128 and 129 is caused to permit the expansion into chamber 123 propane or other suitable gases in the form of a gas from the chamber 129 in which they were contained as a liquid. Thus this spring 131 is sufficiently heavy to exceed the preload pressure of the propane in chamber 129 acting against the ball 132 so that when propane escapes past this ball, it is in the form of a gas. This then gives us a composite liquid gas—gas spring, formed in separate chambers of the same liquid spring from the same basic element propane, butane, etc. Thus a liquid gas spring and a gas spring are maintained in seals with a series spring effect from the gas and liquid gas spring, and with the liquid in its liquid state serving to act as a shock absorber in the liquid gas portion of the spring shock. Further any leakage from the chamber 123 would be replaced from propane supplied past the ball 132.

Again, as in the case of the fluid spring illustrated in FIGS. 8 to 10, when the spring is fully compressed, excess liquid propane in the fully contracted chamber 123 can return to chamber 128 via the spring-loaded check valve 122, and response to compression in the manner illustrated by curve C, FIG. 2.

Return flow of the liquid propane from the chamber 129 to the chambers 128 and 130 is via the orifice 126 which offers relatively small impedance during its return movement so that the spring illustrated in FIGS. 11 and 12 has high restoring forces.

What is claimed is:

1. A fluid spring comprising a hollow body forming a chamber and having a bore through one wall thereof in which bore a piston is slidingly fitted to be movable by imposed pressures into and out of said chamber whereby the movements of said piston vary the available volume for fluid occupancy of said chamber, and a fluid filling the chamber and therein subject to varying intrusions by the piston and consequent diverse compressions, which fluid freezes below 65° F., boils under atmospheric pressure below about 68° F., has a critcial temperature above about 90° F., and is convertible completely to its liquid phase at a temperature between 65° F. and the critical temperature of said fluid by an imposed pressure which exceeds the saturated vapor pressure of the said fluid at the temperature at which the said pressure is imposed.

2. A fluid spring as set forth in claim 1 wherein at its preload condition the fluid filling said chamber is partly liquid and partly gaseous to provide a two stage spring involving first a compression of the gaseous portion to its liquid phase and thereafter a compression of the resulting total liquid in said chamber by an imposed pressure on the spring up to about 20,000 p.s.i.g. and reversal of said sequence of changes in phases by decrease of temperature and imposed pressure.

3. A fluid spring as set forth in claim 1 wherein said fluid filling said chamber is selected from the group consisting of propane, butane and nitrous oxide.

4. A fluid spring as set forth in claim 3 wherein in its preload condition the fluid filling said chamber is partly liquid and partly gaseous to provide two stage springing involving first a compression of the gaseous portion to its liquid phase and thereafter a compression of the resulting total liquid in said chamber by an imposed pressure on the spring up to about 20,000 p.s.i.g., and reversal of the said sequence of changes of fluid phases by decrease of temperature and imposed pressure.

5. A fluid spring comprising a hollow member forming a chamber and having a bore through one wall thereof in which bore a piston is slidingly fitted to be movable into and out of said chamber whereby the movement of said piston varies the available volume for fluid occupancy of said chamber, a dashpot head fast to one of said members and having a sliding fit with the other of said members, one of said members being provided with orifice means bypassing said dashpot head, a fluid filling said chambers on opposite sides of said dashpot head, which fluid freezes below −65° F. and boils under atmospheric pressure below about 68° F. and has a critical temperature above about 90° F., and which at an ambient temperature of about 68° F. and is convertible completely to liquid phase at temperatures between −65° F. and the critical temperature by an imposed pressure which exceeds the saturated vapor pressure of the said fluid at the temperature at which the said pressure is imposed.

6. A fluid spring as set forth in claim 5 wherein at its preload condition the fluid filling said chamber is partly liquid and partly gaseous to provide a two stage spring involving first a compression of the gaseous portion to its liquid phase and thereafter a compression of the resulting total liquid in said chamber by imposed pressures up to 20,000 p.s.i.g. and reversal of said sequence of changes in the fluid phases by decrease of temperature and imposed pressure.

7. A fluid spring as set forth in claim 5 wherein said fluid filling said chamber is selected from the group consisting of propane, butane and nitrous oxide.

8. A fluid spring comprising a piston member, a hollow member forming a chamber and having a bore through one wall thereof in which bore said piston member is slidingly fitted to be movable into and out of said chamber whereby the movement of said piston varies the available volume for fluid occupancy of said chamber, a dashpot head fast to one of said members and having sliding fit with the other of said members, one of said members being provided with an orifice bypassing said dashpot head with the discharge end, under working pressure against said member, being of enlarging conical form, and a fluid filling said chamber during the final part of the working stroke of the spring.

9. A fluid spring as set forth in claim 8 wherein the contained fluid freezes below −65° F., boils under atmospheric pressure below about 68° F. and has a critical temperature above about 90° F., and which at an ambient temperature of about 68° F. and is as completely convertible to its liquid phase at a temperature between −65° F. and the critical temperature of the fluid by an imposed pressure which exceeds the saturated vapor pressure of the said fluid at the temperature at which the said pressure is imposed.

10. A fluid spring as set forth in claim 9 wherein said fluid in the spring chamber at preload condition of the fluid spring is partly liquid and partly gaseous to provide a two stage spring involving first a compression of the gaseous portion to its liquid phase and thereafter a compression of the resulting total liquid in the spring by an imposed pressure on the spring up to about 20,000 p.s.i.g. and reversal of the said sequence of changes in the fluid phases by decrease of temperature and imposed pressure.

11. A fluid spring as set forth in claim 9 wherein said fluid is selected from the group consisting of propane, butane and nitrous oxide.

12. A compressible fluid spring comprising a collapsible mechanism including a tubular piston, piston means operatively associated with said tubular piston and movable in the opposite direction in response to external loads applied to the tubular piston and piston means to provide an effective piston displacement per unit of lineal movement of the tubular piston which is different from the corresponding displacement volume of the piston for the same lineal movement, and a fluid filling said collapsible mechanism and confined between said tubular piston and said piston means, which fluid freezes below −65° F., boils under atmospheric pressure below about 68° F. and has a critical temperature above about 90° F. and is convertible completely to liquid phase at temperatures between −65° F. and the critical temperature of said fluid by an imposed pressure which exceeds the saturated vapor pressure of the said fluid at the temperature at which the said pressure is imposed.

13. A fluid spring as set forth in claim 12 wherein said confined fluid is selected from the group consisting of propane, butane and nitrous oxide.

14. A fluid spring, comprising a tubular body cylinder closed at one end and open at its other end, a tubular ram closed at one end and having its opposite end formed to provide a dashpot head with an opening therethrough, a piston slidingly fitted in said tubular ram and having a stud extending through said opening and fixed to the closed end of said body cylinder, a sleeve valve slidingly mounted on said stud between said piston and dashpot head in position to close said opening on recoil of the fluid spring, and means providing a limited bypass flow of said fluid around said valve head on recoil of the fluid spring.

15. A liquid spring as set forth in claim 14 wherein said fluid can leak past said piston.

16. The method of precompressing a fluid contained within the hollow enclosed collapsible mechanism of a fluid spring which comprises cooling said fluid to a temperature considerably below its boiling point under atmospheric pressure but above its freezing point, inserting said cooled liquid into said hollow collapsible mechanism, enclosing said collapsible mechanism to seal the liquid therein, and permitting said hollow enclosed collapsible mechanism and the container-cooled liquid to warm up and effect such precompression of said contained liquid.

17. The method of precompressing a polymorphic liquid-gas fluid which is compressible in both its liquid and gaseous phases and is in its gaseous phase under ambient pressures and temperatures and which at higher pressures up to 20,000 p.s.i.g. is in its liquid phase which comprises cooling said liquid to a low temperature, inserting said cooled liquid into said hollow collapsible mechanism, enclosing said collapsible mechanism to seal the liquid therein, and permitting said hollow enclosed collapsible mechanism and the contained cooled liquid to warm up and effect such precompression of said contained liquid.

18. A fluid spring, comprising a tubular piston, piston means operatively associated with said tubular piston and movable in the opposite direction from said tubular piston in response to external loads applied to the tubular piston and the piston means to provide an effective piston displacement per unit of lineal movement of the tubular piston which is different from the corresponding displacement volume of the piston for the same lineal movement and a fluid disposed in said collapsible mechanism and confined between said tubular piston and said piston means which fluid freezes below −65° F., boils under atmospheric pressure below about 68° F., has a critical temperature above about 90° F., and is convertible completely to its liquid phase at a temperature between 65° F., and the critical temperature of said fluid by an imposed pressure which exceeds the saturated vapor pressure of the said fluid at the temperature at which the said pressure is imposed.

19. A liquid spring, comprising a cylinder having a closed end and an open end, a tubular piston having a closed end and an open end with said open end reciprocably disposed in said cylinder and in sealing engagement with the wall of said cylinder, and piston member secured to said cylinder and reciprocably disposed in said tubular piston in sliding engagement with the wall of said tubular piston, a passage extending from one side of said piston to the other and having a check valve seat facing the closed end of said tubular piston, a valve head normally held in engagement with said valve seat, and a fluid disposed in said cylinder and tubular piston which fluid freezes below −65° F., boils under atmospheric pressure below about 68° F., has a critical temperature above about 90° F., and is convertible completely to its liquid phase at a temperature between 65° F., and the critical temperature of said fluid by an imposed pressure which exceeds the saturated vapor pressure of the said fluid at the temperature at which the said pressure is imposed.

References Cited by the Examiner

UNITED STATES PATENTS

| | | | |
|---|---|---|---|
| 1,902,421 | 3/33 | Rowden et al. | 267—64 X |
| 1,918,699 | 7/33 | Gruss | 267—64 |
| 2,155,605 | 4/39 | Levy | 267—64 |
| 2,180,231 | 11/39 | Geertz et al. | 62—9 |

(Other references on following page)

UNITED STATES PATENTS

| | | | |
|---|---|---|---|
| 2,333,095 | 11/43 | Dowty | 267—64 |
| 2,608,404 | 8/52 | Gruss | 267—64 |
| 2,614,833 | 10/52 | Laugaudin | 267—64 |
| 2,711,313 | 6/55 | Zumwalt | 267—64 |
| 2,805,854 | 9/57 | Gaebler | 267—64 |
| 2,882,042 | 4/59 | Fleckenstein | 267—65 |
| 2,909,368 | 10/59 | Taylor | 267—64 |
| 2,949,315 | 8/60 | Taylor | 267—64 |
| 2,959,410 | 11/60 | Fullam et al. | 267—64 |
| 2,999,680 | 9/61 | Eiseman | 267—64 |
| 3,034,309 | 5/62 | Muck | 62—9 |

FOREIGN PATENTS

| | | |
|---|---|---|
| 1,132,386 | 6/62 | Germany. |
| 11,726 | 1894 | Great Britain. |
| 615,549 | 1/49 | Great Britain. |
| 809,682 | 3/59 | Great Britain. |

OTHER REFERENCES

Din, Thermo-Dynamic Functions of Gases, Butterworth, page 131.

ARTHUR L. LA POINT, *Primary Examiner*.